J. J. FLACK.
AXLE FOR CARRIAGE.

No. 6,688.  Patented Sept. 4, 1849.

Figure 1:
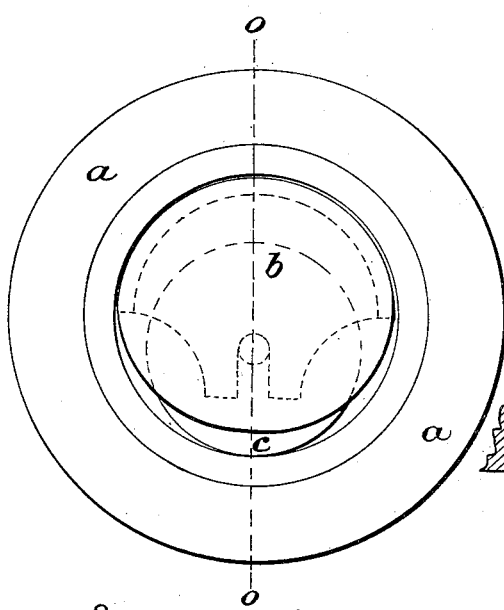
Figure 2:
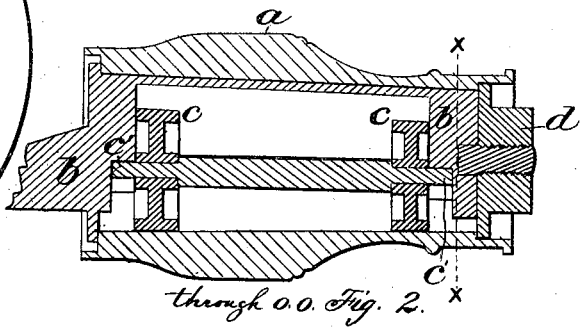

Enlarged scale through x.x Fig. 1.

through o.o. Fig. 2.

UNITED STATES PATENT OFFICE.

JOHN J. FLACK, OF JOLIET, ILLINOIS.

AXLE OF CARRIAGES.

Specification of Letters Patent No. 6,688, dated September 4, 1849.

*To all whom it may concern:*

Be it known that I, JOHN J. FLACK, of Joliet in the county of Will and State of Illinois, have invented a new and useful Improvement in the Axles for All Wheel-Carriages, Railroad-Cars, &c.; and I hereby declare the following to be a full and exact description thereof.

The principal object of said improvement is to do away with friction, so that any given weight can be moved or transported with a comparatively small power, or that a comparatively small power will serve to move or transport any given weight with much more ease and facility than it can be done without such improvement.

The accompanying drawings represent said improvements.

In Figure 1, $a$, $a$, represent the hub; $b$, $b$, represent the axle; $c$, $c$, represent the friction rollers; $c'$, $c'$, represent the gudgeons or spindles to the friction rollers; $d$, represents the nut that screws on to the end of the axle to prevent the wheel from running off. A linch pin may be used in lieu thereof.

In Fig. 2, (representing an end view) $a$, $a$, represents the hub; $b$, represents the axle; $c$, represents the friction roller.

The axle is to be made with a hollow on the under side, or concave and one or two friction rollers placed in the hollow or concavity of the axle.

The friction rollers, (when two are used) may be both placed on one spindle or gudgeon, one near each end thereof—or they may be placed on two short spindles or gudgeons, one on the center of each, and each end of the spindles or gudgeons placed in rests, (so called) the rests being made fast and solid to the concavity of the arm of the axle. When only one friction roller is used, it is made long enough to supply the place of the two, and the ends of the spindle or gudgeon are placed in rests as above. The friction rollers are constructed and placed as before described, to avoid the friction occasioned by the common axles, and require a much smaller force or power to move or transport any given weight than the common axle.

What I claim as my invention is—

Making the axle concavo-convex, combined with the friction rollers, placed in the concavities thereof in such a manner that the rollers shall protrude from the under-side of the axles, downward, and rest upon the boxes in the hub (the upper side of the said friction rollers are never to come in contact with the concavity of the axles) having the whole load or burden supported by the rollers, and thereby save a large amount of friction which occurs in using the common or sliding axles.

Dated 13th July A. D. 1849.

JOHN J. FLACK.

Witnesses:
 URI OSGOOD,
 W. E. LITTLE.